J. J. MUELLER, Jr.
AUTOMATIC POTENTIAL REGULATOR FOR DYNAMOS.
APPLICATION FILED MAY 21, 1909.
965,396.
Patented July 26, 1910.
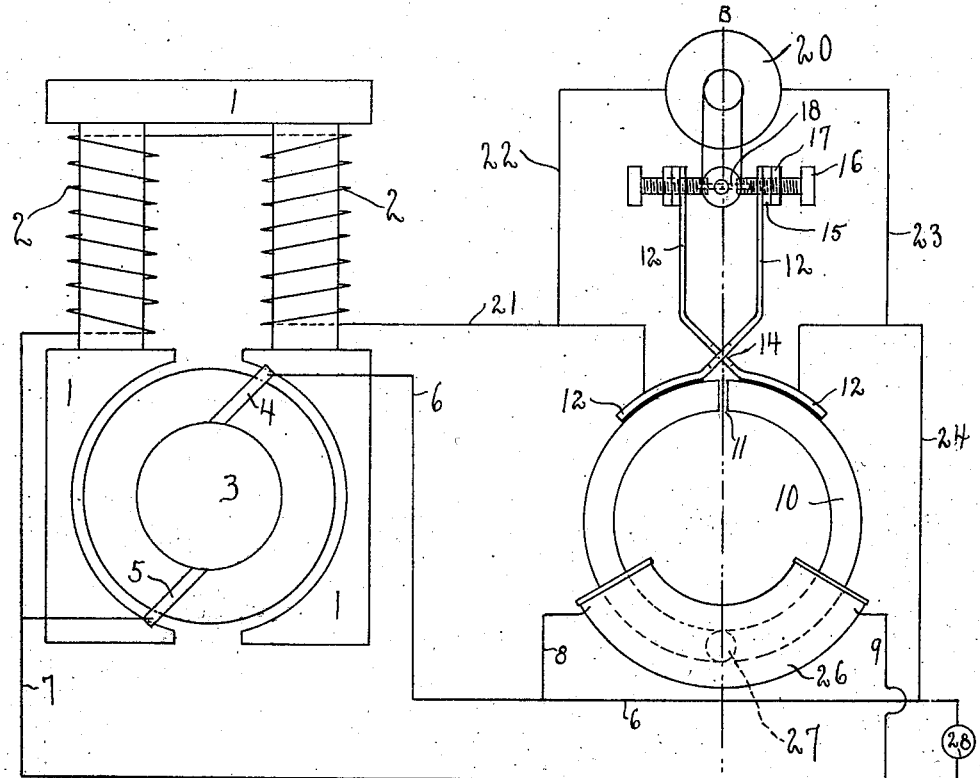
Fig I.
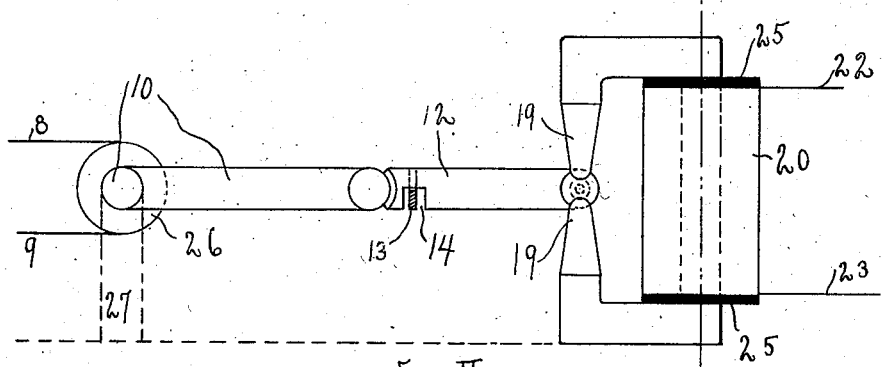
Fig II.
WITNESSES:
William A. Radtke
Oscar W. Dauber
INVENTOR
John J. Mueller, Jr.
BY
Andrew J. Neureuther
ATTORNEY

UNITED STATES PATENT OFFICE.

JOHN J. MUELLER, JR., OF PERU, ILLINOIS.

AUTOMATIC POTENTIAL-REGULATOR FOR DYNAMOS.

965,396.
Specification of Letters Patent.
Patented July 26, 1910.

Application filed May 21, 1909. Serial No. 497,487.

*To all whom it may concern:*

Be it known that I, JOHN J. MUELLER, Jr., of the city of Peru, in the county of Lasalle and State of Illinois, have invented a certain new and useful Improvement in Automatic Potential-Regulators for Dynamos, of which the following is a specification.

The object of my invention is to provide a regulator for a dynamo electric machine which will automatically regulate the potential or voltage on the supply wires, so that an even and constant voltage will always be maintained on said supply wires, notwithstanding the varying amount of current taken from said lines, or the abnormal increase of speed of the dynamo electric machine or generator as it is called.

Further, my invention consists in such novel constructions as will be described and set forth in the claims.

In the drawings, Figure 1, is a view showing my regulator connected to a dynamo. Fig. 2, is a side view of my regulator showing a part in section along a line A. B. of Fig. 1.

Similar numerals represent the same parts throughout the drawings.

In the drawings, 1 is a dynamo or electric generating machine, 2 is the field winding on same, 3 is its armature having a commutator on which the brushes 4 and 5, which collect the current from them, bear. Brush 4, is connected to the wire 6 which forms one side of the line and a brush 5 is connected to a wire 7 which forms the other side of the line. Connected across the lines 6 and 7, by means of wires 8 and 9, is an electromagnet 26 which has a ring-shaped core 10, which is parted at 11 and fastened to a base, not shown in the drawings, by means of a foot 27 projecting from core 10. Fastened to this core 10, on either side of the slot 11, are resilient members 12 and 13 which are notched at 14 so that they can cross each other, as shown, without coming into contact with each other. These resilient members 12 and 13 are insulated from this iron core 10, so as to prevent the electric current from shunting from one to the other through said core 10. Threaded into the upper ends of each of the resilient members 12 and 13 is a thumb screw 16 which carries a lock nut 17, the ends of the members 12 and 13 being reinforced by means of a nut 15 which is fastened to same. Into the ends of each of the thumb screws 16 is inserted a platinum point 18 which points remain in contact when the voltage is normal. Adjacent to the contact surfaces of these platinum points 18 are the conical poles 19 of an electromagnet 20, which has its winding confined by the insulated washers 25 on same. The field winding 2 of generator 1 is connected to wire 7 (one side of the line) and to the other side of the line 6, through the resilient members 12 and 13, above mentioned. Shunted across these resilient members 12 and 13, by means of wires 22 and 23 is the electromagnet 20 above mentioned, so that if the contact points 18 of the resilient members 12 and 13 be separated, the current will flow around through this electromagnet, setting up a strong magnetic field across the gap between the pole pieces 19 which will "blow" the arc which forms at the break when points 18 are separated, and which melts away these points 18, causing them to stick, which makes the device inoperative. This has been the trouble with the regulators in use before my invention. I find that in my regulator this does not occur. I further find, that no matter how great is the variation of the load 28 across the line, the voltage will remain constant.

In practice the operation of my device is as follows:—The speed of the generator is raised abnormally above that required for a given voltage, or which is practically the same thing, the generator can be wound to give a voltage considerably higher than that required on the line. The tendency will be, as soon as the generator is started, in either case to give an abnormally high voltage, which being impressed across the coil of the electromagnet 26 will cause the ends of ring 10 to close the slot 11, which in turn will separate the contact points 18 of the resilient members 12 and 13 which immediately shunts the entire field current through the coil of the electromagnet 20 setting up a strong magnetic field around the gap adjacent to said contact points which prevents the usual arc or spark across said contact points as the circuit is opened. Opening the field circuit at the points 18 as above mentioned, reduces the field current, which in turn reduces the magnetic field of the generator, which again drops the voltage and decreases the magnetic attraction at the slot 11 and again permits the contact points 18 of resilient members 12 and 13 to come into contact, when the voltage will again rise, and the above result will be repeated, until the number of contacts made are so proportioned to the time element of the electromagnet 20 that it permits the required average field current to pass through it to produce the constant voltage required on the line, and it will do this for any speed above that required to produce the necessary voltage. It is evident that the devices used before my invention which use non-inductive resistances cannot accomplish this result, since the resistance is constant, which when the speed variation is great, is necessarily great, and consequently the variation of the field current is great the effect of which controls the variation of the voltage produced. With a variable resistance it requires the constant attention of the operator which defeats the purpose of the regulator. With my invention all the non-inductive resistance is kept out of the field circuit, and the magnetism induced by the current is used to protect the platinum contact points from melting and sticking together.

I claim:

1. An automatic potential regulator for dynamos, comprising an electromagnet connected across the main current lines, a core in said electromagnet, a resistance in the field circuit, contact points on the core of said magnet and insulated therefrom, coöperating with said electromagnet for opening and closing a shunt around said resistance, said resistance comprising an electromagnet connected around said points, and pole pieces on said electromagnet adjacent to said contact points.

2. An automatic potential regulator for dynamos, comprising an electromagnet connected across the main current lines, a core in said electromagnet, a resistance in the field circuit, contact points on the core of said magnet and insulated therefrom, coöperating with said electromagnet for opening and closing a shunt around said resistance, said resistance comprising an electromagnet connected across said contact points, and conical pole pieces on said magnet adjacent to said contact points, substantially as shown and described.

3. In an automatic potential regulator for dynamos, an electromagnet across the main current lines, a core in said electromagnet circular in form with its poles adjacent, a member mounted on each of said pole pieces, an adjustable contact point on each of said members, said points being normally in contact, an electromagnet shunted around said points coöperating therewith to regulate the quantity of the current in the field of said dynamo.

4. In an automatic potential regulator for dynamos, an electromagnet across the main current lines, a core in said electromagnet circular in form with its poles adjacent, a member mounted on each of said pole pieces, an adjustable contact point on each of said members, said points being normally in contact, an electromagnet shunted around said points, the pole pieces of said electromagnet terminating adjacent to said contact points, substantially as shown and for the purpose set forth.

5. An apparatus for producing a constant voltage with a variable speed, comprising a dynamo wound for an abnormally high voltage, an electromagnet electrically connected across the supply wires from said dynamo, a core in said electromagnet circular in form with its poles adjacent, a member mounted on each of said poles, an adjustable contact point on each of said members, an electromagnet shunted around said points, coöperating therewith to regulate the quantity of the current passing through the field of said dynamo.

6. An apparatus for producing a constant voltage with a variable speed, comprising a dynamo wound for an abnormally high voltage, an electromagnet electrically connected across the supply wires from said dynamo, a core in said electromagnet circular in form with its pole pieces adjacent, a member mounted on each of said pole pieces, an adjustable contact point on each of said members, an electromagnet shunted around said points, the pole pieces of said electromagnet terminating adjacent to said contact points.

7. An apparatus for producing a constant voltage, comprising a dynamo normally wound for a given voltage and driven at an abnormal speed, an electromagnet electrically connected across the supply wires from said dynamo, a core in said electromagnet circular in form with its pole pieces adjacent, a member mounted on each of said pole pieces, an adjustable contact point on each of said members, an electromagnet shunted around said points, and coöperating therewith to regulate the quantity of the current passing through the field of said dynamo.

8. An apparatus for producing a constant electromotive-force, comprising a dynamo normally wound and driven at an abnormally high speed, an electromagnet electrically connected across the supply wires from said dynamo, a core in said electromagnet with its pole pieces adjacent, a member mounted on each of said pole pieces and insulated therefrom, an adjustable contact point on each of said members, an electromagnet shunted around said points and conical pole pieces on said electromagnet terminating adjacent to said contact points, substantially as shown and described.

JOHN J. MUELLER, Jr.

Witnesses:
WILLIAM A. RADTKE,
PAUL BRAUNS.